United States Patent [19]

Shieh

[11] Patent Number: 6,081,818

[45] Date of Patent: Jun. 27, 2000

[54] CUT OBJECT DYNAMIC DISPLAY AND METHOD OF DISPLAYING CUT OBJECTS

[75] Inventor: Johnny Meng-Han Shieh, Austin, Tex.

[73] Assignee: International Business Machines Corporation, Armonk, N.Y.

[21] Appl. No.: 08/764,696

[22] Filed: Dec. 11, 1996

[51] Int. Cl.$^7$ .................................................. G06F 17/24
[52] U.S. Cl. ............................................................. 707/539
[58] Field of Search ..................................... 707/539, 520; 345/349, 340, 326, 507, 346; 395/651, 200.48

[56] References Cited

U.S. PATENT DOCUMENTS

| | | |
|---|---|---|
| 4,760,647 | 8/1988 | Gillis . |
| 4,866,539 | 9/1989 | Marazzi et al. . |
| 5,070,478 | 12/1991 | Abbott . |
| 5,337,406 | 8/1994 | Takakura et al. ........................ 707/520 |
| 5,339,392 | 8/1994 | Risberg . |
| 5,420,976 | 5/1995 | Schell . |
| 5,442,739 | 8/1995 | Saito . |
| 5,559,942 | 9/1996 | Gough et al. ............................ 345/346 |

OTHER PUBLICATIONS

Rathbone, Andy. "Windows 3.1 For Dummies" 2d. (Foster City: IDG Books Worldwide) pp. 88, 91, 92, 93, 108, 110, 111, 130, 132, 133, 134, 135, 139, 140 & 141, Jan. 1, 1994.

Young, Margaret Levine and David C. Kay. "Wordperfect 6.1 For Windows For Dummies." 2d. (Foster City: IDG Books Worldwide) pp. 88, 86 & 87, Jan. 1, 1994.

Duncan, Thom. Software Opens Communications. "LAN Times: Test Report." vol. 12, No. 8, p. 112 [pp. 1–6], Apr. 24, 1995.

*Primary Examiner*—Joseph H. Feild
*Assistant Examiner*—John L. Young
*Attorney, Agent, or Firm*—George P. Schultz; Akin, Gump, et al.; Thomas E. Tyson

[57] ABSTRACT

A dynamic buffer is used to display an object from a document. The cut object is visible to the user as the floating cursor is positioned to a desired insertion point. The cut object can be any combination of text, graphics or data. The display can move in conjunction with the floating cursor or be parked at a predetermined or user-selected position. The cut object can be abbreviated to fit the display, or the display can be sized or scrolled. Once an object has been cut and thus stored in the dynamic buffer, it can be edited, or pasted to a new location or merely deleted.

40 Claims, 7 Drawing Sheets

This was the best of times
this was the worst of
times.

was the worst of — 214
Tis a f
  do to — 216

This was the best of times
this was the worst of
times.
208
  was the worst of
Tis a far far better thing
 was the worst of do
today than I .....

Fig. 3f

This was the best of times
this was the worst of
times.

Tis a far far better thing
 was the worst of do
today than I .....

Fig. 3g

CUT OBJECT DYNAMIC DISPLAY AND METHOD OF DISPLAYING CUT OBJECTS

FIELD OF THE INVENTION

This invention relates to a dynamic buffer used to store and display information cut or copied from a document generated on a computer with a graphical user interface. The cut information is displayed in a buffer window adjacent to a floating cursor, thereby providing the user with an immediate visual reminder of the content of the dynamic buffer.

BACKGROUND OF THE INVENTION

Personal computer systems (PCs) such as IBM personal computers, operate due to the interaction of hardware and software components. The hardware for a PC consists of a system unit having a single system processor, a display monitor, a keyboard, one or more diskette drives, a fixed disk storage, and an optional printer. The software which takes advantage of this hardware is generally classified into operating system software and applications software.

From the earliest personal computer systems, it was recognized that the operating system software would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes), small memory size (12 Kbyte) and reasonable performance. DOS served well for earlier machines, but as memory and hardware prices declined and performance increased a more user friendly intuitive operating system was needed. Beginning in 1986, IBM started development of a graphical user interface (GUI) designed to mask the complexity of the hardware technology advances and present to the user an intuitive, flexible, and easy-to-use system. This operating system was named OS/2.

With GUI systems, the computer system is controlled using a pointing device such as a mouse. The pointing device controls the location of a pointer, or floating cursor, that appears on the screen of the computer's display device. Elements on the screen such a icons may be manipulated using the mouse. Icons are graphical representations of various objects such as disk drives, applications, or documents, and windows. In this way, the graphical user interface provides a more intuitive facility for interacting with the computer operating system than the conventional command-line interface. The icons and windows of the GUI serve as references or pointers to the data or system resources and enable the user to interface with the computer in a simpler, logical manner which mimics the real world.

Graphical user interfaces, including OS/2, typically provide the user with the ability to cut and paste objects from within a document. The document can contain any combination of text, graphics, or data, all generally referred to as objects. The user can block a portion of this document by designating a beginning and end locations for the blocked portion. A cut command is entered, thereby removing the blocked portion from the document and storing it in a scratchpad memory. The blocked portion can then be deleted or pasted at another location in the same document or another.

With past graphical user interfaces, the cut object was hidden from the user's view. It could be retrieved by inspection of a scratchpad memory. However, this required additional commands and time. Instead most user's simply try to remember the exact content of the cut object. Thus, the prior methods of cutting and pasting information were prone to error. A need exists for a method of cutting and pasting information that provides the user a constant visual reminder of the cut material during the cut and paste operation.

SUMMARY OF THE INVENTION

The present invention relates to a dynamic buffer for a graphical user interface of a personal computer operating system which provides a display of cut objects or items during a cut and paste operation. The dynamic buffer is used to implement a method of displaying objects cut from an underlying document. Thus, the dynamic buffer addresses many of the disadvantages found in prior art graphical user interfaces.

The present invention is implemented within the context of a graphical user interface that allows a user to cut objects from a document and then paste the cut objects at a position within the same document or another document. When the user cuts the object, the object is stored in a dynamic buffer and displayed in a buffer display visible during the cut and paste operation. If the cut object is too large for the display, it can be abbreviated to fit the size of the display. Alternatively, the display can be scrolled either vertically or horizontally for viewing a large object. In another embodiment, the display can be sized. The user can also minimize the display into an icon or command bar. This allows the user to maximize the remaining screen display. The buffer display for the cut object can float adjacent to the floating cursor, or it can be parked in a predetermined location, or at a user-selected location. Each of these functions is equally suited for objects that are merely copied rather than cut from a document. Thus, "cut objects" is meant to include both cut and copied objects. Further, "document" is meant to include any storable file accessed by a user for editing. Thus, a document could include a text document, a business spreadsheet or other suitable file. "Object" is meant to include any text, data, or graphics within the document.

Once the object is cut, the display can be transparent. In other words, the remaining text of the document is visible through the buffer display of the object. In another embodiment, the buffer display is opaque and covers part of the document being edited. The buffer display can also overlay the document, or assume a position of "lowest focus" whereby it drops under the lowest priority window opened in the graphical user interface.

BRIEF DESCRIPTION OF THE DRAWINGS

The foreground aspects and other features of the present invention are explained in the following written description, taken in connection with the accompanying drawings, wherein:

FIGS. 3a to 3i illustrate the method of cutting an object and displaying the cut object until another action is implemented.

DETAILED DESCRIPTION OF THE DRAWINGS

Figure 1:
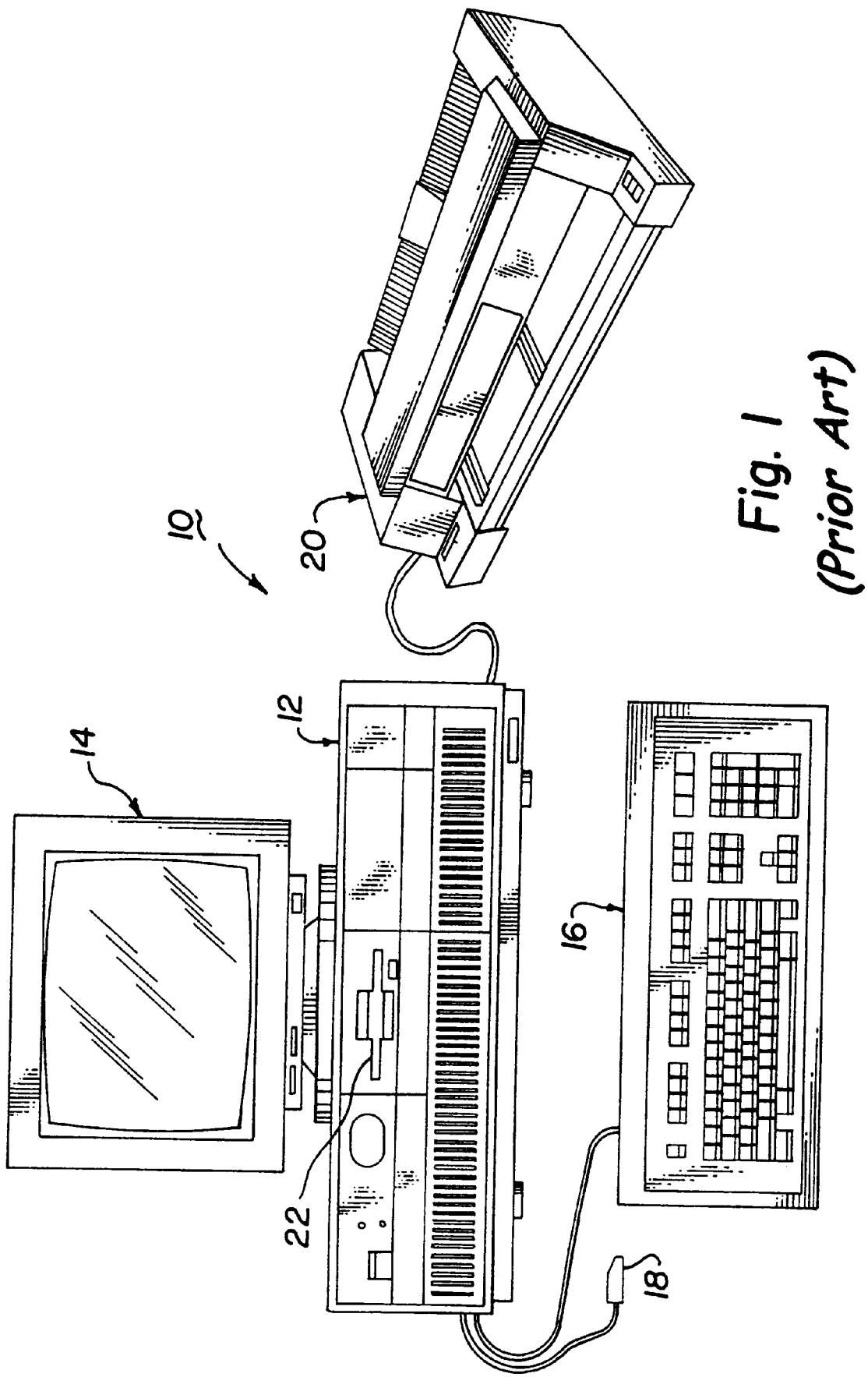
FIG. 1 is a personal computer system in which the present invention can be employed.

The dynamic buffer and method of the present invention is implemented in the context of a graphical user interface on a computer. The dynamic buffer can be created by a software routine written in any number of suitable programming languages. A computer typically used in conjunction with a software operating system with a graphical user interface is illustrated in FIG. 1. A personal computer system 10 is the combination of interconnected components. For example, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functions as explained later. The right mouse button is alternatively referred to as the second mouse button or mouse button 2. An optional output device such as a printer 20 can also be connected to the system unit 12. Finally the system unit 12 may include one or more mass storage devices such as the diskette drive 22.

The system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM) a read only memory (ROM), and a plurality of I/O devices.

In operation, the system processor functions under an operating system, such as IBM's OS/2 operating system or the DOS Operating System. This type of operating system includes a BIOS interface between the I/O devices and the operating system. BIOS, which can be stored in a ROM on a motherboard or planar, includes diagnostic routines which are contained in a power-on, self-test section, referred to as POST.

Figure 2A:
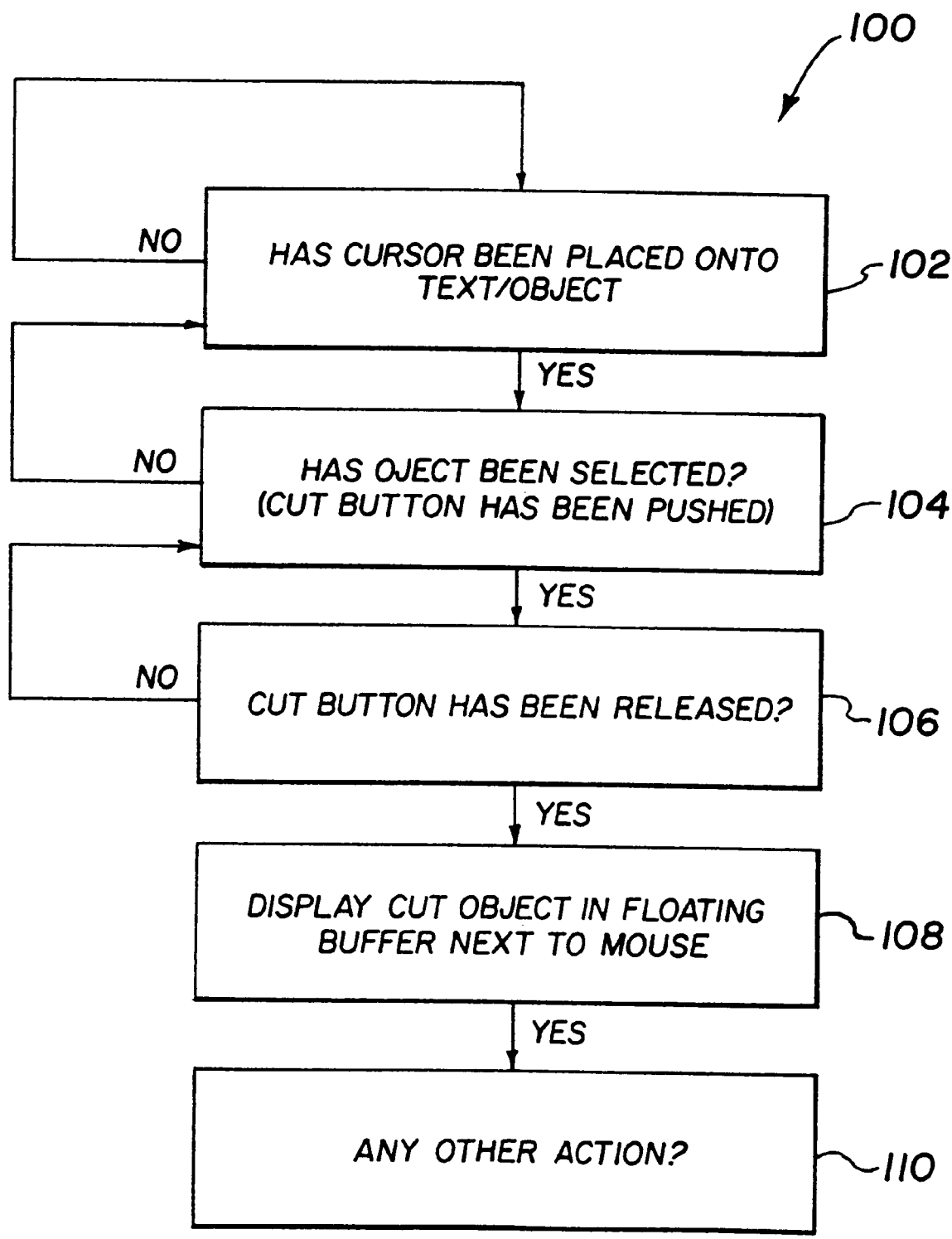
FIG. 2a is a flow chart of the cut and display portion of the present method.

FIG. 2a is a flow chart which illustrates the steps 100 of cutting and displaying the cut object. First, the floating cursor must be placed 102 onto text or any other object within a document. The method of selecting the object will vary between operating systems. For example, in a Microsoft Windows environment, the floating cursor is positioned at the beginning of the text to be cut and the left mouse button depressed 104 and held. The floating cursor is then positioned at the end of the material to be cut, while the left button is still depressed. The left mouse button is then released 106. This action highlights the selected text. A cut or copy command is then entered. If the cut command is entered 104, the selected text or object is removed from the document. Within an OS/2 environment, the mouse has a button devoted to the cut function. Thus, the cut button is pushed 104 and the cursor repositioned to the end of the material to be cut. The cut button is then released 106. Once the cut button is released, a separate display window will appear. The cut object will appear 108 within this new display window. The system will then await any other actions 110.

Figure 2B:
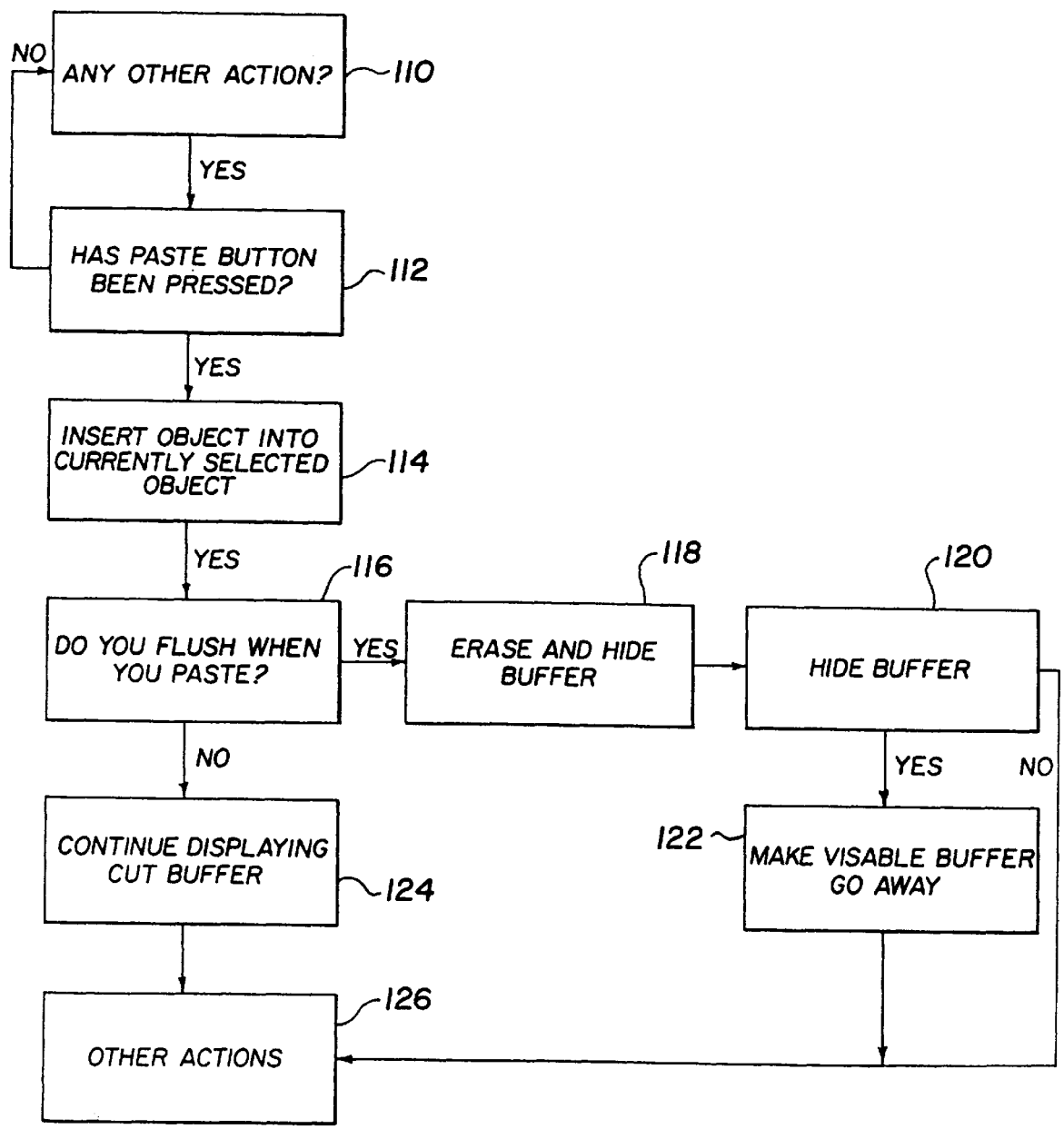
FIG. 2b is a flow chart of the paste portion of the present method.

Other actions can include pasting the cut object into the original document or another document. Thus, as shown in FIG. 2b, the system will await a paste command 112, which can be issued by a dedicated button on an OS/2 mouse. If the paste command is received, the cut object will be inserted 114 into the document at whatever location the cursor is positioned. Within an OS/2 environment, the information within the buffer is maintained even after a paste command is implemented. However, the system can be implemented either to flush 116 the buffer upon a paste command or not. The buffer can be erased 118 and the display hidden or maintained 120, 122. Alternatively, if the object stored in the buffer is maintained, then the buffer display will continue to be displayed 124. Thus, a user can repeat his paste command at several locations. The system then awaits other actions 126.

Figures 3A, 3B:
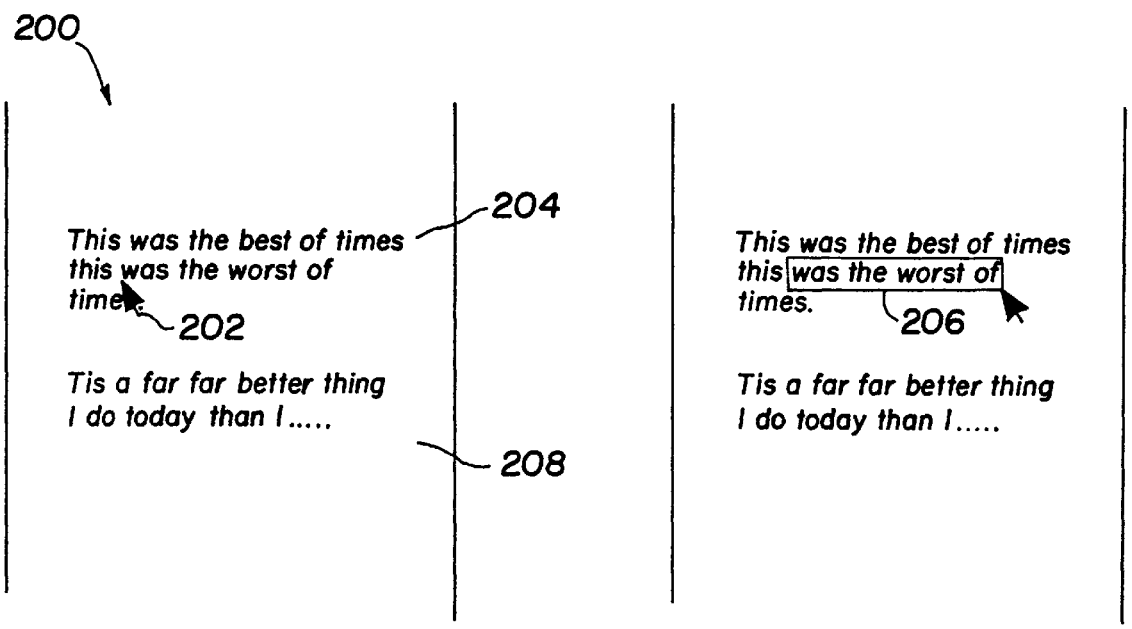
Figure 3C:
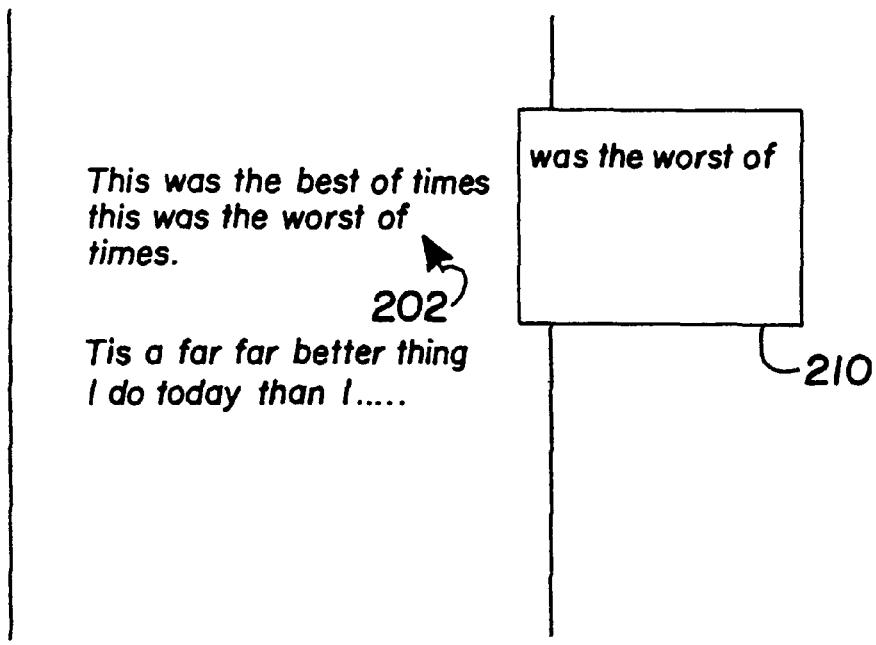
Figure 3D:
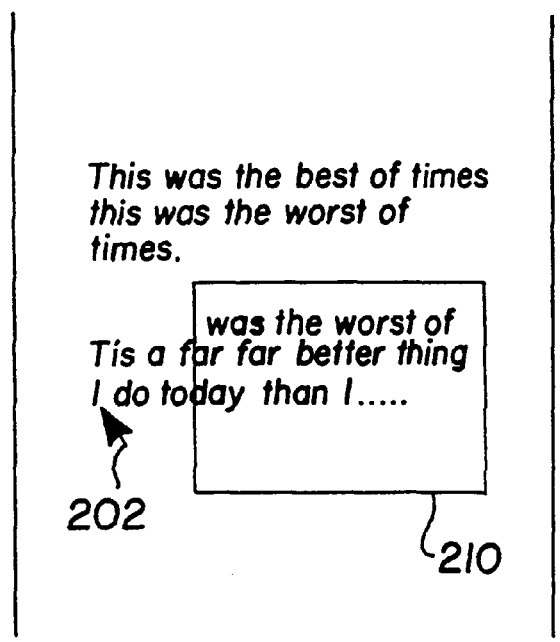
Figure 3H:
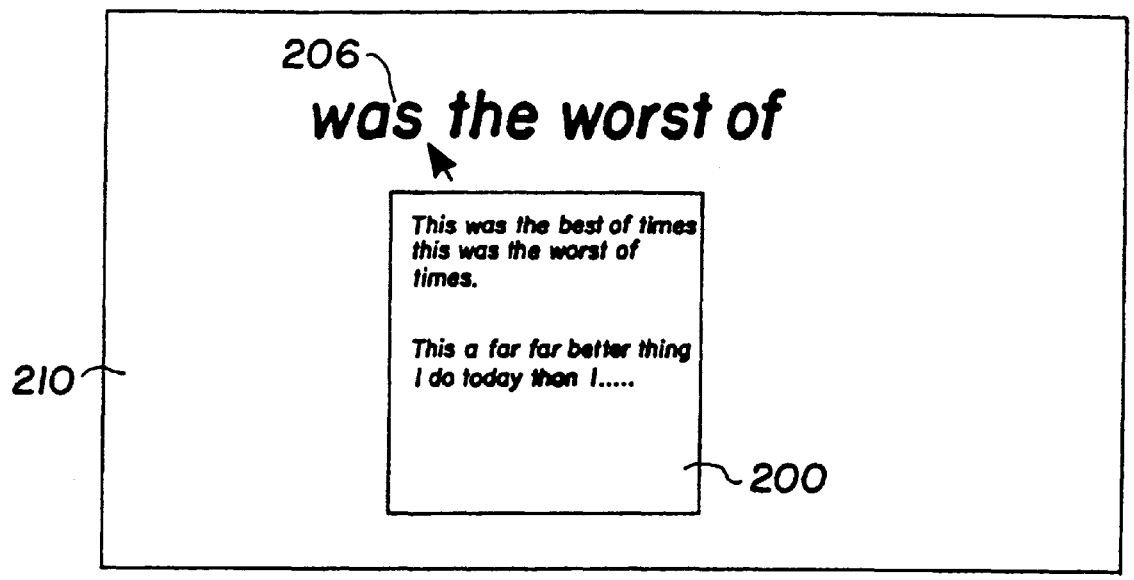

FIGS. 3a to 3i illustrate the use of the dynamic buffer and method on two lines of text. FIG. 3a shows the original document text 200 which consists of two sentences 204, 208. The first 204 is the sentence "This was the best of times this was the worst of times" and the second sentence 208 is "Tis a far far better thing I do today than I." A floating cursor or pointer 202 has been positioned in front of the word "was" in the first sentence. A group of four words 206 is highlighted by dragging the floating cursor across them, as shown in FIG. 3b. In this example, the highlighted material is to be copied. A copy command is entered by the user and the highlighted material now appears in the buffer display 210, as illustrated in FIG. 3c. The buffer display 210 can then float alongside the pointer 202 as it is positioned at a desired insertion point as shown in FIG. 3d. In this example, the buffer display window is transparent, allowing the user to view the underlying text in the document. FIG. 3e illustrates an alternative buffer display 212 which is opaque, obscuring the underlying text. The buffer display 212 also contains vertical and horizontal scroll controls 214, 218 and position indicators 216, 220. Thus, if the cut object is too large to be effectively viewed in its entirety in the buffer display, the user can scroll the image both horizontally and vertically. In an alternative version, the cut object can be abbreviated to fit in the buffer display. In other words, if a paragraph of text is cut, perhaps only the first four words and last four words would be displayed.

Figure 3I:
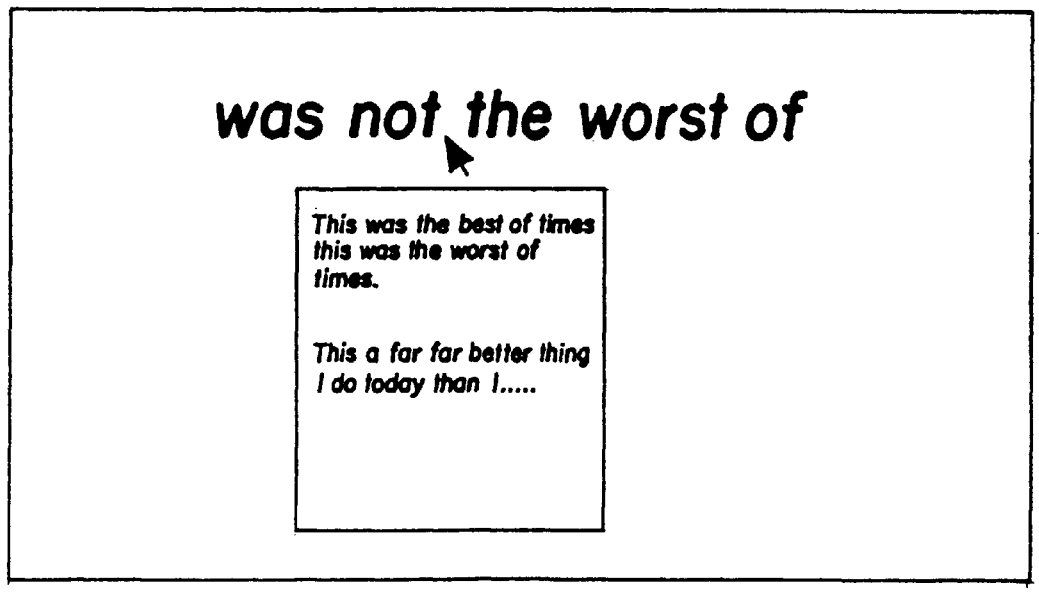

The user enters a paste command, inserting the copied text into the second sentence 208 which now reads "Tis a far far better thing I was the worst of do today than I . . . ." FIG. 3f illustrates the buffer remaining open after a paste command. FIG. 3g illustrates the buffer being hidden after a paste command. In one embodiment, the buffer remains smaller than the display of the original document. However, FIG. 4h illustrates the reversal of display sizing, with the document display 200 becoming smaller than the buffer display 210. The pointer 202 can then be positioned into the text 206 within the buffer display. The text 206 can be edited as shown in FIG. 3i.

It can be appreciated from the foregoing descriptions and explanations, that the present invention contemplates a computer system having a graphical user interface. Accordingly, it will be appreciated that the detailed disclosure has been presented by way of example only and is not intended to be limiting. Various alterations, modifications and improvements will readily occur to those skilled in the art and may be practiced without departing from the spirit and scope of the invention. The invention is limited only as required by the following claims and equivalents thereto.

I claim:

1. A method of displaying a cursor and a cut object selected from a document generated on a computer with a graphical user interface and a monitor comprising the steps of:

(a) cutting an object from the document;

(b) displaying the cut object in a buffer display on the monitor; and (c) automatically moving the buffer display to correspond with the movements of the cursor.

2. The method of claim 1 wherein step (c) further comprises locating the buffer display in close proximity to the cursor.

3. The method of claim 1 further comprising:
(d) continuously displaying the buffer display on the monitor.

4. The method of claim 3 wherein the graphical user interface further comprises a set of windows with the active windows being continuously displayed on the monitor and wherein step (d) further comprises continuously displaying the buffer display on the monitor if the buffer display is not the active window.

5. The method of claim 1 further comprising:
(d) moving the cursor to a desired insertion point in the document; and
(e) inserting the cut object into the document at the desired insertion point.

6. The method of claim 5 further comprising:
(f) removing the cut object from the buffer display after the cut object has been inserted.

7. The method of claim 1 further comprising:
(d) moving the cursor to a desired insertion point in a second document; and
(e) inserting the cut object into the second document at the desired insertion point.

8. The method of claim 7 further comprising:
(f) removing the cut object from the buffer display after the cut object has been inserted.

9. The method of claim 1 wherein step (a) further comprises storing the cut object in a memory.

10. The method of claim 1, wherein step (b) further comprises displaying the cut object in a transparent buffer display on the monitor.

11. The method of claim 1, wherein step (b) further comprises displaying the cut object in an opaque buffer display on the monitor.

12. A display system for use in a graphical user interface, said interface for the display of a cursor and allowing the cutting of objects from a document, said display system comprising:
(a) means for storing the cut object in a memory;
(b) means for displaying the cut object on a display; and
(c) means for automatically moving the display to correspond with the movements of the cursor.

13. The display system of claim 12 further comprising:
(d) means for setting the proximity of the cursor to the display.

14. The display system of claim 12 wherein the graphical user interface further comprises a set of windows with the active window being continuously displayed on the monitor and wherein the display system further comprises:
(d) means for continuously displaying the buffer display on top of the active window.

15. The display system of claim 12 further comprising:
(d) means for removing the cut object from the memory.

16. The display system of claim 12 further comprising:
(d) means for removing the cut object from the buffer display.

17. The display system of claim 12, wherein step (b) further comprises means for displaying the cut object in a transparent display on the monitor.

18. The display system of claim 12, wherein step (b) further comprises means for displaying the cut object in a opaque display on the monitor.

19. A method of automatically displaying a buffer display upon the creation of a cut object from a document generated on a computer with a graphical user interface which occupies a monitor and a series of windows displayed on the monitor, including the active windows and inactive windows, the method comprising the steps of:
(a) cutting an object from the document;
(b) automatically displaying the buffer display on the monitor; and
(c) displaying the cut object in the buffer display.

20. The method of claim 19 further comprises:
(d) inserting the cut object into the document;
(e) automatically removing the buffer display from the monitor upon insertion of the cut object.

21. The method of claim 19 further comprises:
(d) inserting the cut object into the document;
(e) continuing to display the buffer display on the monitor upon insertion of the cut object.

22. The method of claim 19, wherein step (b) further comprises continuously displaying the buffer display on top of the active window.

23. The method of claim 22, wherein step (b) further comprises continuously displaying the buffer display on top of the active window if the buffer display is not an active window.

24. The method of claim 19, wherein step (b) further comprises automatically displaying a transparent buffer display on the monitor.

25. The method of claim 19, wherein step (b) further comprises automatically displaying an opaque buffer display on the monitor.

26. A display system for use in a graphical user interface with a monitor, said interface for displaying a cursor and for allowing the cutting of objects from a document, said display system comprising:
(a) means for cutting an object;
(b) means for automatically displaying the cut object on the monitor.

27. The display system of claim 26 further comprising:
(c) means for inserting the cut object in the document;
(d) means for automatically removing the cut object from the monitor after it has been inserted.

28. The display system of claim 26 further comprising:
(c) means for inserting the cut object;
(d) means for continuing to display the cut object on the monitor after it has been inserted.

29. The method of displaying an abbreviated cut object where an object is cut from a document generated on a computer with a graphical user interface and a monitor; the method comprising the steps of:
(a) cutting an object from the document;
(b) displaying a buffer display on the monitor;
(c) displaying an abbreviated cut object in the buffer display, wherein the abbreviated cut object is a subset of the cut object.

30. The method of claim 29, wherein the abbreviated cut object of step (c) further includes a first and last partial portion of the cut object.

31. The method of claim 29 further comprising:
(d) inserting the cut object into the document.

32. The method of claim 29 further comprising:
(d) inserting the cut object into a second document.

33. The method of claim 29, wherein step (b) further comprises displaying a transparent buffer display on the monitor.

34. The method of claim 29, wherein step (b) further comprises displaying an opaque buffer display on the monitor.

35. A display system for displaying an abbreviated cut object where an object is cut from a document generated on a computer with a graphical user interface and a monitor; the display system comprising:
- (a) means for cutting an object from the document;
- (b) means for storing the cut object in a memory;
- (c) means for displaying a buffer display after the object is cut; and
- (d) means for displaying an abbreviated cut object in the display.

36. The display system of claim 35, wherein the means for displaying an abbreviated cut object of step (d) includes means for displaying the first and last plurality of words of the cut object.

37. The display system of claim 35 further comprising:
- (e) means for inserting the cut object into the document.

38. The display system of claim 35 further comprising:
- (e) means for inserting the cut object into a second document.

39. The display system of claim 35, wherein step (c) further comprises means for displaying a transparent buffer display on the monitor.

40. The display system of claim 35, wherein step (c) further comprises means for displaying an opaque buffer display on the monitor.

* * * * *